(12) United States Patent
Nakamura et al.

(10) Patent No.: US 9,891,353 B2
(45) Date of Patent: Feb. 13, 2018

(54) LIGHT-DIFFUSING-ELEMENT MANUFACTURING METHOD AND LIGHT-DIFFUSING ELEMENT

(71) Applicant: NITTO DENKO CORPORATION, Ibaraki-shi, Osaka (JP)

(72) Inventors: Kozo Nakamura, Ibaraki (JP); Takehito Fuchida, Ibaraki (JP); Hiroyuki Takemoto, Ibaraki (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 0 days.

(21) Appl. No.: 14/783,757

(22) PCT Filed: Apr. 10, 2013

(86) PCT No.: PCT/JP2013/060802
§ 371 (c)(1),
(2) Date: Oct. 9, 2015

(87) PCT Pub. No.: WO2014/167663
PCT Pub. Date: Oct. 16, 2014

(65) Prior Publication Data
US 2016/0070036 A1    Mar. 10, 2016

(51) Int. Cl.
*G02B 5/02* (2006.01)
*G02B 1/04* (2006.01)
(52) U.S. Cl.
CPC ............ *G02B 5/0242* (2013.01); *G02B 1/04* (2013.01); *G02B 5/0268* (2013.01)
(58) Field of Classification Search
None
See application file for complete search history.

(56) References Cited

U.S. PATENT DOCUMENTS

| | | | |
|---|---|---|---|
| 6,111,699 | A | 8/2000 | Iwata et al. |
| 6,327,088 | B1 | 12/2001 | Iwata et al. |

(Continued)

FOREIGN PATENT DOCUMENTS

| | | |
|---|---|---|
| CN | 101029937 A | 9/2007 |
| CN | 102356335 A | 2/2012 |

(Continued)

OTHER PUBLICATIONS

Office Action dated Jul. 22, 2014, issued in counterpart Taiwanese Patent Application No. 102113378, with English Translation; Granted on Feb. 11, 2015 as Patent No. I472808 (9 pages).

(Continued)

*Primary Examiner* — Derek S Chapel
(74) *Attorney, Agent, or Firm* — Westerman, Hattori, Daniels & Adrian, LLP

(57) ABSTRACT

Provided is a method of manufacturing a light diffusing element by which a light diffusing element having a high haze value, having strong diffusibility, and having suppressed backscattering by virtue of having a smooth surface can be manufactured at low cost and with high productivity (within a short period of time). The method of manufacturing a light diffusing element according to one embodiment of the present invention includes: a step A of mixing light diffusing fine particles and an organic solvent to prepare a mixed liquid and to swell the light diffusing fine particles; a step B of mixing the mixed liquid and a matrix-forming material containing a precursor of a resin component and ultrafine particle components; and a step C of polymerizing the precursor of a resin component to form a matrix including a resin component and the ultrafine particle components.

10 Claims, 3 Drawing Sheets

(56) References Cited

U.S. PATENT DOCUMENTS

| | | | |
|---|---|---|---|
| 6,480,249 B2 | 11/2002 | Iwata et al. | |
| 6,771,336 B2 | 8/2004 | Tatsuta et al. | |
| 8,405,794 B2 | 3/2013 | Fuchida et al. | |
| 8,953,118 B2 | 2/2015 | Nishimura et al. | |
| 2002/0001055 A1 | 1/2002 | Kimura et al. | |
| 2002/0015123 A1 | 2/2002 | Iwata et al. | |
| 2002/0135714 A1 | 9/2002 | Tatsuta et al. | |
| 2006/0132922 A1* | 6/2006 | Takao | G02B 1/10 359/601 |
| 2007/0139782 A1* | 6/2007 | Ito | G02B 5/0226 359/599 |
| 2007/0207298 A1 | 9/2007 | Suzuki et al. | |
| 2009/0246490 A1* | 10/2009 | Ibuki | G02B 5/02 428/212 |
| 2011/0256312 A1* | 10/2011 | Suzuki | G02B 1/118 427/164 |
| 2011/0317099 A1 | 12/2011 | Fuchida et al. | |
| 2012/0307179 A1 | 12/2012 | Nishimura et al. | |
| 2013/0181206 A1 | 7/2013 | Nagase et al. | |
| 2013/0258481 A1* | 10/2013 | Fukuda | C09D 5/006 359/601 |
| 2016/0054485 A1* | 2/2016 | Nakamura | G02B 5/0242 359/599 |

FOREIGN PATENT DOCUMENTS

| | | |
|---|---|---|
| CN | 102640020 A | 8/2012 |
| CN | 102667586 A | 9/2012 |
| JP | 11-160505 A | 6/1999 |
| JP | 3071538 B2 | 7/2000 |
| JP | 2002-214408 A | 7/2002 |
| JP | 2005-281476 A | 10/2005 |
| JP | 2006-11419 A | 1/2006 |
| JP | 2008-209927 A | 9/2008 |
| JP | 2009-69427 A | 4/2009 |
| JP | 2010-185968 A | 8/2010 |
| JP | 2010-250295 A | 11/2010 |
| JP | 2010-250296 A | 11/2010 |
| JP | 2011-112964 A | 6/2011 |
| JP | 4756100 B2 | 8/2011 |
| JP | 2011-197546 A | 10/2011 |
| JP | 2012-69257 A | 4/2012 |
| JP | 2012-225957 A | 11/2012 |
| JP | 2005-309399 A | 11/2015 |
| TW | 201218854 A1 | 5/2012 |

OTHER PUBLICATIONS

Office Action dated Sep. 2, 2015, issued in counterpart Japanese Patent Application No. 2012-064146, with English Translation (7 pages).

Office Action dated Apr. 25, 2017, issued in counterpart Chinese Application No. 201380075452.X, with English translation, (15 pages).

* cited by examiner

Fig.4
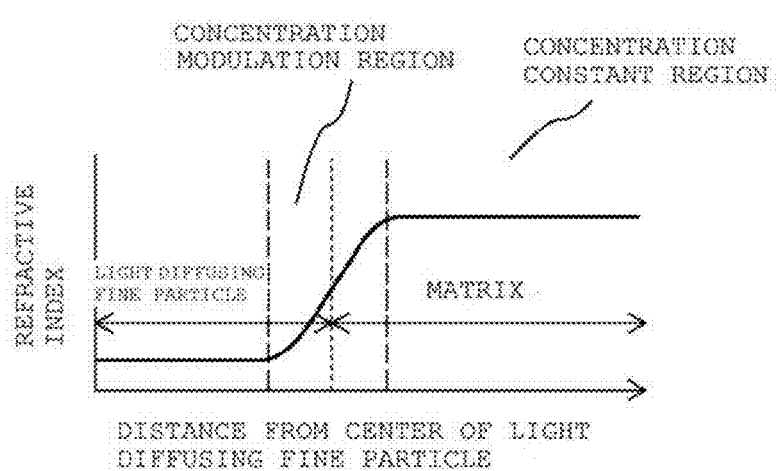
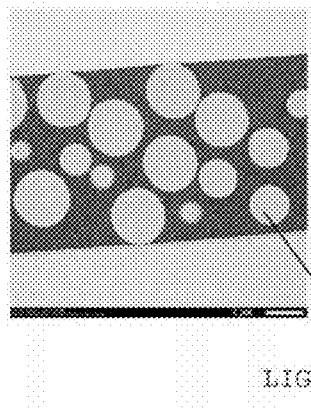
FIG. 5(a)
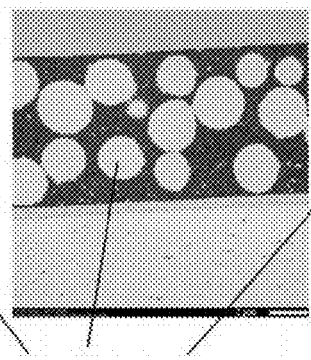
FIG. 5(b)
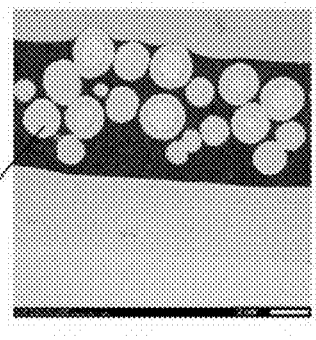
FIG. 5(c)

LIGHT-DIFFUSING-ELEMENT MANUFACTURING METHOD AND LIGHT-DIFFUSING ELEMENT

TECHNICAL FIELD

The present invention relates to a method of manufacturing a light diffusing element and a light diffusing element.

BACKGROUND ART

A light diffusing element is widely used in illumination covers, screens for projection televisions, surface-emitting apparatus (for example, liquid crystal display apparatus), and the like. In recent years, the light diffusing element has been used for enhancing the display quality of the liquid crystal display apparatus or the like and for improving a viewing angle characteristic, for example. As the light diffusing element, for example, there is proposed a light diffusing element in which fine particles are dispersed in a matrix such as a resin sheet (see, for example, Patent Literature 1). In such light diffusing element, most of incident light scatters forward (output plane side), whereas a part thereof scatters backward (incident plane side). As a refractive index difference between each of the fine particles and the matrix becomes larger, diffusibility (for example, a haze value) increases. On the other hand, as the refractive index difference becomes larger, backscattering increases. When the backscattering is significant, in the case where the light diffusing element is used in a liquid crystal display apparatus, its screen becomes whitish at the time of entrance of external light into the liquid crystal display apparatus, and hence it is difficult to display a video or an image having contrast.

As means for eliminating the backscattering as described above, there has been proposed a light diffusing element obtained by dispersing, in a resin, refractive index gradient fine particles, such as so-called gradient index (GRIN) fine particles, in each of which a refractive index continuously changes from a center of the fine particle toward an outer side (see, for example, Patent Literature 2). However, the GRIN fine particles are insufficient in productivity owing to their manufacturing process, which is more complicated than that of general fine particles, and hence are not practical.

In addition, as means for continuously changing the refractive index in the light diffusing element including the GRIN fine particles, there has been proposed a technology involving allowing a precursor of a matrix resin component (e.g., a monomer) to permeate fine particles before polymerizing a matrix resin component (see Patent Literature 3). However, even in the case of such technology, in order to obtain high-haze light diffusibility, the permeation of the precursor of a matrix resin component requires a long period of time or requires heating at high temperature, and hence there is still room for improvement in terms of productivity.

CITATION LIST

Patent Literature

[PTL 1] JP 3071538 B2
[PTL 2] JP 2002-214408 A
[PTL 3] JP 4756100 B2

SUMMARY OF INVENTION

Technical Problem

The present invention has been made in order to solve the problems of the related art described above, and an object of the present invention is to provide a method of manufacturing a light diffusing element by which a light diffusing element having a high haze value, having strong diffusibility, and having suppressed backscattering by virtue of having a smooth surface can be manufactured at low cost and with high productivity (within a short period of time).

Solution to Problem

A method of manufacturing a light diffusing element according to one embodiment of the present invention includes: a step A of mixing light diffusing fine particles and an organic solvent to prepare a mixed liquid and to swell the light diffusing fine particles; a step B of mixing the mixed liquid and a matrix-forming material containing a precursor of a resin component and ultrafine particle components; and a step C of polymerizing the precursor of a resin component to form a matrix including a resin component and the ultrafine particle components.

In one embodiment of the present invention, the precursor of a resin component has a molecular weight of from 100 to 700.

In one embodiment of the present invention, the organic solvent has a boiling point of 70° C. or more.

In one embodiment of the present invention, the organic solvent includes a mixed solvent of a first organic solvent and a second organic solvent, and the first organic solvent more easily permeates the light diffusing fine particles than the second organic solvent does, and has higher volatility than the second organic solvent.

The method of manufacturing a light diffusing element according to one embodiment of the present invention further includes a step of heating a dispersion liquid obtained by the mixing of the mixed liquid and the matrix-forming material containing the precursor of a resin component and the ultrafine particle components, in which the heating is performed at a temperature of 80° C. or less.

In one embodiment of the present invention, the step C includes forming a concentration modulation region having a substantially spherical shell shape in a vicinity of an interface between the matrix and each of the light diffusing fine particles, a weight concentration of the ultrafine particle components in the concentration modulation region increasing with increasing distance from the each of the light diffusing fine particles.

According to another embodiment of the present invention, there is provided a light diffusing element. The light diffusing element is manufactured by the above-mentioned method, and has a haze value of 70% or more.

In one embodiment of the present invention, the light diffusing element has a ten-point average surface roughness Rz of less than 0.20 μm.

In one embodiment of the present invention, the light diffusing element has an average tilt angle θa of less than 0.5°.

In one embodiment of the present invention, the light diffusing element has an arithmetic average surface roughness Ra of less than 0.05 mm.

Advantageous Effects of Invention

According to the present invention, in the manufacture of the light diffusing element including the light diffusing fine particles, the ultrafine particle components, and the resin component, the light diffusing fine particles are swollen in advance by being allowed to contain the organic solvent, and then the light diffusing fine particles are mixed with the matrix-forming material containing the precursor of a resin component and the ultrafine particle components. Thus, the precursor can be allowed to permeate the light diffusing fine particles within a short period of time. In addition, according to the manufacturing method of the present invention, through the polymerization of the precursor permeating the light diffusing fine particles and the precursor not permeating the light diffusing fine particles, the light diffusing element can be manufactured without the need for any special treatment or operation. In the present invention, the precursor can be allowed to permeate the light diffusing fine particles within a short period of time, and hence a light diffusing element having excellent productivity and having excellent smoothness by virtue of the prevention of the aggregation of the light diffusing fine particles and the ultrafine particle components can be manufactured. Further, during the manufacturing steps, in the application and drying of the application liquid containing the above-mentioned components, the swollen light diffusing fine particles have flowability in the application liquid, and hence can follow the change of an application surface at the time of the drying. Thus, a light diffusing element having excellent smoothness can be manufactured.

In the light diffusing element to be obtained by the manufacturing method of the present invention, the concentration modulation region having a substantially spherical shell shape may be formed in the vicinity of the surface of each of the light diffusing fine particles, the weight concentration of the ultrafine particle components in the concentration modulation region increasing with increasing distance from the light diffusing fine particle. In the concentration modulation region, the refractive index is modulated, and hence the refractive index can be allowed to change in stages or substantially continuously in the vicinity of an interface between the light diffusing fine particles and the matrix. Therefore, reflection at an interface between the matrix and each of the light diffusing fine particles can be satisfactorily suppressed, and backscattering can be suppressed. Further, according to the present invention, through the use of the ultrafine particle components each having a specific refractive index and specific compatibility with the resin component, the refractive index of the matrix can be easily adjusted. In particular, according to the present invention, the resin component can permeate the inside of each of the light diffusing fine particles to increase the concentration of the ultrafine particle components in the matrix, and hence a refractive index difference between the matrix and each of the light diffusing fine particles can be easily increased. As a result, the light diffusing element to be obtained by the manufacturing method of the present invention has a high haze value, has strong diffusibility, and has suppressed backscattering.

BRIEF DESCRIPTION OF DRAWINGS

FIG. 4 is a conceptual diagram for illustrating a change in refractive index from the center of the light diffusing fine particle to the matrix in the light diffusing element of the present invention.

FIG. 5($a$) is a transmission micrograph for showing a cross-section of a light diffusing element obtained in Example 1. FIG. 5($b$) is a transmission micrograph for showing a cross-section of a light diffusing element obtained in Comparative Example 1. FIG. 5($c$) is a transmission micrograph for showing a cross-section of a light diffusing element obtained in Comparative Example 4.

DESCRIPTION OF EMBODIMENTS

Figure 1:
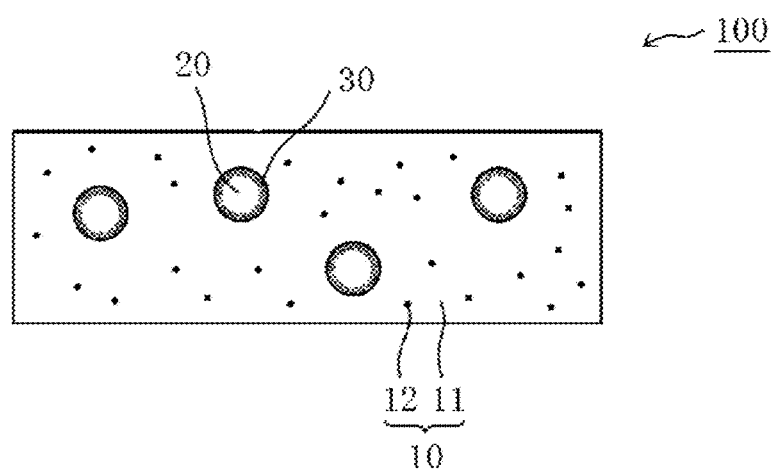
FIG. 1 is a schematic view for illustrating a dispersed state of a resin component of a matrix and light diffusing fine particles in a light diffusing element to be obtained by a manufacturing method according to a preferred embodiment of the present invention.

A. Method of Manufacturing Light Diffusing Element

A method of manufacturing a light diffusing element according to one embodiment of the present invention includes the steps of: mixing light diffusing fine particles and an organic solvent to prepare a mixed liquid and to swell the light diffusing fine particles (referred to as step A); mixing the mixed liquid and a matrix-forming material containing a precursor of a resin component and ultrafine particle components (referred to as step B); and polymerizing the precursor of a resin component to form a matrix including a resin component and the ultrafine particle components (referred to as step C).

A-1. Step A

In the step A, the light diffusing fine particles and the organic solvent are mixed to prepare the mixed liquid. The mixing of the light diffusing fine particles and the organic solvent allows at least part of the light diffusing fine particles to contain the organic solvent, thereby swelling the light diffusing fine particles. The light diffusing fine particles may be allowed to contain the organic solvent by allowing a predetermined period of time to pass after the mixing of the light diffusing fine particles and the organic solvent. For example, the light diffusing fine particles may be allowed to contain the organic solvent by allowing 15 minutes to 90 minutes to pass. The mixed liquid may be prepared by, for example, stirring the light diffusing fine particles in the organic solvent.

A-1-1. Light Diffusing Fine Particles

The light diffusing fine particles are each formed of any appropriate material. It is preferred that the refractive index of each of the light diffusing fine particles satisfy a relationship of the following expression (1).

$$0 < |n_P - n_A| \tag{1}$$

In the expression (1), $n_A$ represents the refractive index of the resin component of the matrix, and $n_P$ represents the refractive index of each of the light diffusing fine particles. $|n_P - n_A|$ is preferably from 0.01 to 0.10, more preferably from 0.01 to 0.06, particularly preferably from 0.02 to 0.06. When $|n_P - n_A|$ is less than 0.01, a concentration modulation region may not be formed. When $|n_P - n_A|$ is more than 0.10, backscattering may increase. It should be noted that the term "concentration modulation region" as used herein refers to a region in the vicinity of an interface between the matrix and each of the light diffusing fine particles in the light diffusing element, in which the weight concentration of the ultrafine particle components is modulated. In the "concentration modulation region", the weight concentration of the ultrafine particle components increases (inevitably, the weight concentration of the resin component decreases) with increasing distance from the light diffusing fine particle. In addition, in the "concentration modulation region", the refractive index substantially continuously changes. Details are described later.

The light diffusing fine particles are each preferably formed of a compound of the same type as the resin component of the matrix to be fed in the subsequent step B. The light diffusing fine particles are each more preferably formed of a compound having high compatibility among compounds of the same type as the resin component of the matrix. This is because in a subsequent step (e.g., the step B), the precursor of the resin component of the matrix is allowed to easily permeate the light diffusing fine particles (details are described later). It should be noted that the term "same type" as used herein means that chemical structures and properties are equivalent or similar, and the term "different type" refers to a type other than the same type. Whether or not materials are of the same type varies depending on the way of selecting a standard. For example, based on whether materials are organic or inorganic, organic compounds are compounds of the same type, and an organic compound and an inorganic compound are compounds of different types. Based on a repeating unit of a polymer, for example, an acrylic polymer and an epoxy-based polymer are compounds of different types in spite of the fact that they are both organic compounds. Based on the periodic table, an alkaline metal and a transition metal are elements of different types in spite of the fact that they are both inorganic elements.

Examples of the material for forming each of the light diffusing fine particles include polymethyl methacrylate (PMMA), polymethyl acrylate (PMA), and copolymers thereof, and cross-linked products thereof. In addition, a silica-based particle may also be used as the material for forming each of the light diffusing fine particles. As components to be copolymerized with PMMA and PMA, there are given polyurethane, polystyrene (PSt), and a melamine resin. The light diffusing fine particles are each particularly preferably formed of PMMA. This is because PMMA has an appropriate relationship with the resin component of the matrix to be fed in the subsequent step B in terms of refractive index and thermodynamic characteristics. Further, the light diffusing fine particles preferably have a cross-linked structure (three-dimensional network structure). The light diffusing fine particles having a cross-linked structure can be swollen. Therefore, such light diffusing fine particles can allow a precursor of a resin component having appropriate compatibility to satisfactorily permeate the inside thereof unlike compact or solid inorganic particles. The cross-linking density of the light diffusing fine particles is preferably so small (rough) that a desired permeation range (described later) may be obtained.

The light diffusing fine particles have an average particle diameter (particle diameter (diameter) before swelling) of preferably from 1.0 µm to 5.0 µm, more preferably from 1.5 µm to 4.0 µm, still more preferably from 2.0 µm to 3.0 µm. The average particle diameter of the light diffusing fine particles is preferably ½ or less (for example, from ½ to 1/20) of the thickness of the light diffusing element. With the average particle diameter having such ratio to the thickness of the light diffusing element, a plurality of the light diffusing fine particles can be arranged in the thickness direction of the light diffusing element, and hence incident light can be multiply diffused while the light passes through the light diffusing element. As a result, sufficient light diffusibility can be obtained.

The standard deviation of the weight average particle diameter distribution of the light diffusing fine particles in the mixed liquid is preferably 1.0 µm or less, more preferably 0.5 µm or less, particularly preferably 0.1 µm or less. In addition, the light diffusing fine particles in the mixed liquid are preferably in a monodispersed state, and for example, have a coefficient of variation in weight average particle diameter distribution ((standard deviation of particle diameter)×100/(average particle diameter)) of preferably 20% or less, more preferably 15% or less. When light diffusing fine particles each having a small particle diameter relative to the weight average particle diameter are present in a large number, the diffusibility may increase too much to satisfactorily suppress backscattering. When light diffusing fine particles each having a large particle diameter relative to the weight average particle diameter are present in a large number, a plurality of the light diffusing fine particles cannot be arranged in the thickness direction of the light diffusing element, and multiple diffusion may not be obtained. As a result, the light diffusibility may become insufficient.

Any appropriate shape may be adopted as the shape of each of the light diffusing fine particles depending on purposes. Specific examples thereof include a spherical shape, a scale-like shape, a plate shape, an elliptic shape, and an amorphous shape. In many cases, spherical fine particles may be used as the light diffusing fine particles.

The light diffusing fine particles each have a refractive index of preferably from 1.30 to 1.70, more preferably from 1.40 to 1.60.

The blending amount of the light diffusing fine particles in the mixed liquid is preferably from 10 parts by weight to 100 parts by weight, more preferably from 15 parts by weight to 40 parts by weight with respect to 100 parts by weight of the matrix to be formed. For example, when the light diffusing fine particles having an average particle diameter in the above-mentioned preferred range are contained in such blending amount, a light diffusing element having extremely excellent light diffusibility can be obtained.

As described above, the light diffusing fine particles are swollen by being mixed with the organic solvent. Immediately before the step B, that is, immediately before the contact of the light diffusing fine particles with the precursor of a resin component, the swelling degree of the light diffusing fine particles is preferably from 105% to 200%. In addition, in the step A, the light diffusing fine particles are preferably swollen to the maximum extent to achieve a state of incapable of any more swelling. When the light diffusing fine particles are sufficiently swollen, the precursor of a resin component is easily allowed to permeate the light diffusing fine particles in the subsequent step B. It should be noted that the term "swelling degree" as used herein refers to the ratio of the average particle diameter of particles in a swollen state to the average particle diameter of particles before swelling.

The content ratio of the organic solvent in each of the light diffusing fine particles immediately before the step B is preferably from 10% to 100%, more preferably from 70% to 100%. The term "content ratio of the organic solvent in each of the light diffusing fine particles" as used herein means the content ratio of the organic solvent in each of the light diffusing fine particles with respect to the content of the organic solvent in the case where the organic solvent is contained in the light diffusing fine particle in a saturated state (maximum content).

A-1-2. Organic Solvent

As the organic solvent, any appropriate organic solvent may be adopted as long as the organic solvent can allow the light diffusing fine particles to be swollen to a desired degree, and can dissolve or homogeneously disperse the light diffusing fine particles and the components to be fed in the subsequent step B. Specific examples of the organic solvent include ethyl acetate, butyl acetate, isopropyl acetate, 2-butanone (methyl ethyl ketone), methyl isobutyl ketone, cyclopentanone, toluene, isopropyl alcohol, n-butanol, and water.

In one embodiment, the organic solvent has a boiling point of preferably 70° C. or more, more preferably 100° C. or more, particularly preferably 110° C. or more, most preferably 120° C. or more. When an organic solvent having relatively low volatility is used, rapid volatilization of the organic solvent during its drying can be prevented, and hence a light diffusing element having excellent smoothness can be obtained.

In another embodiment, a mixed solvent is used as the organic solvent. As the mixed solvent, for example, there is used a solvent obtained by mixing an organic solvent which easily permeates the light diffusing fine particles (first organic solvent), and an organic solvent having low volatility (second organic solvent). It is preferred that the first organic solvent more easily permeate the light diffusing fine particles and have higher volatility than the second organic solvent. It is preferred that the second organic solvent less easily permeate the light diffusing fine particles and have lower volatility than the first organic solvent. The use of such mixed solvent promotes the swelling of the light diffusing fine particles (that is, shortens the period of time required for the manufacturing steps), and prevents rapid volatilization of the organic solvents, with the result that a light diffusing element having more excellent smoothness can be obtained. The first organic solvent has a boiling point of preferably 80° C. or less, more preferably from 70° C. to 80° C. The second organic solvent has a boiling point of preferably more than 80° C., more preferably 100° C. or more, still more preferably 110° C. or more, most preferably 120° C. or more. It should be noted that the ease of the permeation of the organic solvent can be compared on the basis of, for example, the swelling degree of the light diffusing fine particles with respect to the organic solvent, and an organic solvent which allows the light diffusing fine particles to be swollen to a higher swelling degree can be said to be an organic solvent which more easily permeates the light diffusing fine particles. In addition, an organic solvent having a solubility parameter (SP value) close to the SP value of the light diffusing fine particles tends to easily permeate the light diffusing fine particles. A difference between the SP value of the first organic solvent and the SP value of the light diffusing fine particles is preferably 0.5 or less, more preferably 0.4 or less, still more preferably from 0.1 to 0.4. A difference between the SP value of the second organic solvent and the SP value of the light diffusing fine particles is preferably more than 0.5, more preferably 0.6 or more, still more preferably from 0.7 to 2.0. In addition, an organic solvent having a low molecular weight tends to easily permeate the light diffusing fine particles. The first organic solvent has a molecular weight of preferably 80 or less, more preferably 75 or less, still more preferably from 50 to 75. The second organic solvent has a molecular weight of preferably more than 80, more preferably 100 or more, still more preferably from 110 to 140.

The mixed liquid may further contain any appropriate additive depending on purposes. Specific examples of the additive include an initiator, a dispersant, an antioxidant, a modifier, a surfactant, a discoloration preventing agent, a UV absorber, a leveling agent, and an antifoaming agent.

A-2. Step B

In the step B, the mixed liquid prepared in the step A is mixed with the matrix-forming material containing the precursor (monomer) of a resin component and the ultrafine particle components to prepare an application liquid (dispersion liquid) in which the swollen light diffusing fine particles, the precursor of a resin component, and the ultrafine particle components are dissolved or dispersed in the organic solvent. The application liquid is typically a dispersion in which the ultrafine particle components and the light diffusing fine particles are dispersed in the precursor and the organic solvent. Any appropriate means (e.g., stirring treatment) may be adopted as means for dispersing the ultrafine particle components and the light diffusing fine particles.

It is preferred that at least part of the precursor of a resin component permeates the inside of each of the light diffusing fine particles in the step B or a later step. In one embodiment, at least part of the precursor of a resin component is considered to permeate the inside of each of the light diffusing fine particles in the step B. In the present invention, the light diffusing fine particles are swollen in advance in the step A, and hence the precursor of a resin component can be allowed to permeate the inside of each of the light diffusing fine particles within a short period of time. For example, it is considered that when the application liquid is stirred for from 15 minutes to 30 minutes in the step B, the precursor of a resin component can be allowed to permeate the inside of each of the light diffusing fine particles. The thus-prepared application liquid can be subjected to the subsequent step C immediately after being stirred, that is, without being left to stand still. Accordingly, the light diffusing fine particles and the ultrafine particle components can be prevented from aggregating, and hence a light diffusing element having excellent smoothness, being free of uneven distribution of the ultrafine particle components, and having less backscattering can be obtained.

The permeation range of the precursor in each of the light diffusing fine particles is preferably 10% or more, more preferably 50% or more, still more preferably from 80% to 100%. When the permeation range falls within such range, a concentration modulation region is satisfactorily formed, and backscattering can be suppressed. In the present invention, in the manufacture of the light diffusing element, the light diffusing fine particles are sufficiently swollen with the organic solvent and then the resin component in the matrix is polymerized, and thus the resin component can be allowed to sufficiently permeate the light diffusing fine particles. The permeation range may be controlled by adjusting, for example, materials for the resin component and the light diffusing fine particles, the cross-linking density of the light diffusing fine particles, and the kind of the organic solvent to be used in the manufacture.

The solid content of the application liquid may be adjusted so as to be preferably from about 10 wt % to 70 wt %. With such solid content, an application liquid having a viscosity which allows easy application can be obtained.

A-2-1. Resin Component

The resin component is formed of any appropriate material. The refractive index of the resin component preferably satisfies the relationship of the expression (1).

The resin component is preferably formed of a compound of the same type as the light diffusing fine particles. The resin component is more preferably formed of a compound having high compatibility among compounds of the same type as the light diffusing fine particles. With this, the precursor of the resin component can permeate the inside of each of the light diffusing fine particles by virtue of being made of a material of the same type as the light diffusing fine particles. As a result of the polymerization of the precursor in the polymerization step to be described later, the concentration modulation region can be satisfactorily formed in the vicinity of an interface between the matrix and each of the light diffusing fine particles. For example, when a resin for forming the resin component of the matrix is an acrylate-based resin, it is preferred that each of the light diffusing fine particles be also formed of an acrylate-based resin.

The resin component is formed of preferably an organic compound, more preferably an ionizing radiation-curable resin. The ionizing radiation-curable resin is excellent in hardness of an applied film. Examples of the ionizing radiation include UV light, visible light, infrared light, and an electron beam. Of those, UV light is preferred, and thus, the resin component is particularly preferably formed of a UV-curable resin. Examples of the UV-curable resin include radically polymerizable monomers or oligomers such as an acrylate resin (epoxy acrylate, polyester acrylate, acrylic acrylate, or ether acrylate). Specific examples of the monomer component (precursor) for forming the acrylate resin include pentaerythritol triacrylate (PETA), neopentylglycol diacrylate (NPGDA), dipentaerythritol hexaacrylate (DPHA), dipentaerythritol pentaacrylate (DPPA), and trimethylolpropane triacrylate (TMPTA). Such monomer component (precursor) is preferred because of having a molecular weight and a steric structure which are appropriate for permeating the inside of each of the light diffusing fine particles.

The precursor (monomer) of the resin component has a molecular weight of preferably from 100 to 700, more preferably from 200 to 600, particularly preferably from 200 to 500. When the molecular weight falls within such range, the precursor (monomer) of the resin component easily permeates the inside of each of the light diffusing fine particles, and a light diffusing element having excellent diffusibility can be obtained.

The resin component has a refractive index of preferably from 1.40 to 1.60.

The blending amount of the resin component in the application liquid is preferably from 20 parts by weight to 80 parts by weight, more preferably from 45 parts by weight to 65 parts by weight with respect to 100 parts by weight of the matrix to be formed.

The resin component may contain another resin component other than the ionizing radiation-curable resin. The another resin component may be an ionizing radiation-curable resin, a thermosetting resin, or a thermoplastic resin. Typical examples of the another resin component include an aliphatic (for example, polyolefin) resin and a urethane-based resin. In the case of using the another resin component, the kind and blending amount thereof may be adjusted so that the concentration modulation region is satisfactorily formed and the refractive index satisfies the relationship of the expression (1).

A-2-2. Ultrafine Particle Components

The ultrafine particle components may typically function as components for adjusting the refractive index of the matrix. Through the use of the ultrafine particle components, the refractive index of the matrix can be easily adjusted, and a refractive index difference between each of the light diffusing fine particles and the matrix can be increased. In particular, according to the present invention, the resin component can permeate the inside of each of the light diffusing fine particles to increase the concentration of the ultrafine particle components in the matrix, and hence the refractive index difference between the matrix and each of the light diffusing fine particles can be easily increased. As a result, a light diffusing element having a high haze value (strong diffusibility) despite being a thin film can be obtained. The refractive index $n_B$ of each of the ultrafine particle components preferably satisfies the following expression (2).

$$0<|n_P-n_A|<|n_P-n_B| \tag{2}$$

In the expression (2), $n_A$ and $n_P$ are as described above. $|n_P-n_B|$ is preferably from 0.10 to 1.50, more preferably from 0.20 to 0.80. When $|n_P-n_B|$ is less than 0.10, the haze value of the light diffusing element becomes 90% or less in many cases, and as a result, in the case where the light diffusing element is incorporated into a liquid crystal display apparatus, light from a light source cannot be sufficiently diffused and a viewing angle may be narrowed. When $n_P-n_B|$ is more than 1.50, backscattering may increase. In addition, the refractive indices of the resin component, the ultrafine particle components, and the light diffusing fine particles preferably satisfy the following expression (3). The refractive indices of the resin component, the ultrafine particle components, and the light diffusing fine particles more preferably satisfy the expression (2) and the following expression (3). When the refractive indices of the resin component, the ultrafine particle components, and the light diffusing fine particles have such relationship, a light diffusing element having suppressed backscattering while maintaining a high haze can be obtained.

$$|n_P-n_A|<|n_A-n_B| \tag{3}$$

The ultrafine particle components are each formed of preferably a compound of a different type from those of the resin component and the light diffusing fine particles, more preferably an inorganic compound. Preferred examples of the inorganic compound include a metal oxide and a metal fluoride. Specific examples of the metal oxide include zirconium oxide (zirconia) (refractive index: 2.19), aluminum oxide (refractive index: 1.56 to 2.62), titanium oxide (refractive index: 2.49 to 2.74), and silicon oxide (refractive index: 1.25 to 1.46). Specific example of the metal fluoride include magnesium fluoride (refractive index: 1.37) and calcium fluoride (refractive index: 1.40 to 1.43). Those metal oxides and metal fluorides absorb less light and each have a refractive index which is hardly expressed with organic compounds such as the ionizing radiation-curable resin and the thermoplastic resin, thus being able to increase the refractive index difference between each of the light diffusing fine particles and the matrix. In addition, those metal oxides and metal fluorides can each satisfactorily form a concentration modulation region in the vicinity of an interface between each of the light diffusing fine particles and the matrix by virtue of appropriate dispersibility with the resin component, thus being able to suppress backscattering. A particularly preferred inorganic compound is zirconium oxide. This is because zirconium oxide has a large refractive index difference from each of the light diffusing fine particles and has appropriate dispersibility with the resin component, and hence can satisfactorily form a concentration modulation region having desired characteristics (or structure).

The refractive index of each of the ultrafine particle components is preferably 1.40 or less or 1.60 or more, more preferably 1.40 or less or from 1.70 to 2.80, particularly preferably 1.40 or less or from 2.00 to 2.80. When the refractive index is more than 1.40 or less than 1.60, the refractive index difference between each of the light diffusing fine particles and the matrix becomes insufficient, and in the case where the light diffusing element to be obtained is used in a liquid crystal display apparatus adopting a collimated backlight front diffusing system, light from a collimated backlight cannot be diffused enough, which may narrow a viewing angle.

The ultra fine particle components may each be made porous to decrease the refractive index.

The average particle diameter of the ultrafine particle components is preferably from 1 nm to 100 nm, more preferably from 10 nm to 80 nm, still more preferably from 20 nm to 70 nm. As described above, through the use of the ultrafine particle components having an average particle diameter smaller than the wavelength of light, geometric reflection, refraction, and scattering are not caused between each of the ultrafine particle components and the resin component, and a matrix which is optically uniform can be obtained. As a result, a light diffusing element which is optically uniform can be obtained.

It is preferred that the ultrafine particle components have satisfactory dispersibility with the resin component. The term "satisfactory dispersibility" as used herein means that an applied film, which is obtained by applying an application liquid obtained by mixing the resin component, the ultrafine particle components, and the organic solvent, followed by removing the solvent by drying, is transparent.

It is preferred that the ultrafine particle components be subjected to surface modification. By conducting surface modification, the ultrafine particle components can be satisfactorily dispersed in the resin component, and the concentration modulation region can be satisfactorily formed in the vicinity of an interface between each of the light diffusing fine particles and the matrix. Any suitable means may be adopted as surface modification means as long as the effects of the present invention are obtained. The surface modification is typically conducted by applying a surface modifier onto the surface of each of the ultrafine particle components to form a surface modifier layer. Preferred specific examples of the surface modifier include coupling agents such as a silane-based coupling agent and a titanate-based coupling agent, and a surfactant such as a fatty acid-based surfactant. Through the use of such surface modifier, the wettability between the resin component and each of the ultrafine particle components is enhanced, the interface between the resin component and each of the ultrafine particle components is stabilized, and the ultrafine particle components can be satisfactorily dispersed in the resin component.

The blending amount of the ultrafine particle components in the application liquid is preferably from 10 parts by weight to 70 parts by weight, more preferably from 30 parts by weight to 60 parts by weight with respect to 100 parts by weight of the matrix to be formed.

A-3. Step C

The application liquid is typically applied onto a base material before the step C (step of polymerizing the precursor). Any appropriate film may be adopted as the base material as long as the effects of the present invention are obtained. Specific examples thereof include a triacetyl cellulose (TAC) film, a polyethylene terephthalate (PET) film, a polypropylene (PP) film, a nylon film, an acrylic film, and a lactone-modified acrylic film. The base material may be subjected to surface modification such as easy adhesion treatment, or may contain an additive such as a lubricant, an antistat, or a UV absorber, as required.

Any appropriate method using a coater may be adopted as a method of applying the application liquid onto the base material. Specific examples of the coater include a bar coater, a reverse coater, a kiss coater, a gravure coater, a die coater, and a comma coater.

Then, the precursor is polymerized. Any appropriate method may be adopted as the polymerization method depending on the kind of the resin component (thus, the precursor thereof). For example, in the case where the resin component is an ionizing radiation-curable resin, the precursor is polymerized by irradiation with ionizing radiation. In the case of using UV light as the ionizing radiation, the integrated light quantity is preferably from 200 mJ to 400 mJ. The transmittance of the ionizing radiation with respect to the light diffusing fine particles is preferably 70% or more, more preferably 80% or more. In addition, for example, in the case where the resin component is a thermosetting resin, the precursor is polymerized by heating. The heating temperature and the heating time may be appropriately set depending on the kind of the resin component. It is preferred that the polymerization be conducted by irradiation with ionizing radiation. The irradiation with ionizing radiation can cure an applied film while satisfactorily keeping a refractive index distribution structure (concentration modulation region), and hence a light diffusing element having a satisfactory diffusion characteristic can be manufactured. It is preferred that simultaneously with the formation of the matrix by the polymerization of the precursor, a concentration modulation region having a substantially spherical shell shape be formed in the vicinity of the surface of each of the light diffusing fine particles, the weight concentration of the ultrafine particle components in the concentration modulation region increasing with increasing distance from the light diffusing fine particle. That is, according to the manufacturing method of the present invention, the precursor permeating the inside of each of the light diffusing fine particles and the precursor not permeating the light diffusing fine particles can be simultaneously polymerized to form the concentration modulation region in the vicinity of the interface between the matrix and each of the light diffusing fine particles and to simultaneously form the matrix.

Needless to say, the method of manufacturing a light diffusing element of the present invention may include, in addition to the step A to the step C, any appropriate step, treatment, and/or operation at any appropriate time point. The kind of such step or the like and the time point at which such step or the like is performed may be appropriately set depending on purposes. For example, as required, the method of manufacturing a light diffusing element of the present invention further includes the step of heating the application liquid applied onto the base material. In one embodiment, the application liquid may be dried by the heating. Such heating may be performed, for example, before the polymerization step or after the polymerization step. The heating of the application liquid is preferably performed before the polymerization step. This is because the heating can promote the permeation of the precursor of a resin component into the light diffusing fine particles. Any appropriate method may be adopted as a method of heating the application liquid. The heating is performed at a temperature of, for example, preferably 80° C. or less, more preferably from 50° C. to 70° C., and the heating is performed for a period of time of, for example, from 30 seconds to 5 minutes. According to the manufacturing method of the present invention, even when the heating is performed at low temperature, the permeation of the precursor of a resin component into the light diffusing fine particles can be promoted, and a light diffusing element having strong diffusibility can be obtained.

Thus, the light diffusing element is formed on the base material. The light diffusing element manufactured by the manufacturing method of the present invention has strong diffusibility and has excellent smoothness. The mechanism by which the light diffusing element having excellent smoothness is obtained is presumably as described below. The light diffusing fine particles swollen by sufficiently containing the organic solvent have flowability in the application liquid, and hence can follow the change of an application liquid surface (e.g., the change of the application liquid surface by drying). As a result, the light diffusing fine particles in the present invention can be prevented from protruding from an applied film, and a light diffusing element having excellent smoothness can be obtained. On the other hand, in a related-art light diffusing element manufactured without allowing light diffusing fine particles to sufficiently contain an organic solvent, the light diffusing fine particles have low flowability in an application liquid. When the application liquid containing such light diffusing fine particles is subjected to a drying step, the light diffusing fine particles cannot follow the change of the application liquid surface. As a result, the light diffusing fine particles protrude from the applied film to generate unevenness in the surface of the light diffusing element.

In addition, when the light diffusing fine particles are swollen in advance as described above, the precursor of a resin component easily permeates the inside of each of the light diffusing fine particles. Through the permeation of the precursor of a resin component, the light diffusing fine particles are further swollen to have a further increased average particle diameter. When the average particle diameter of the light diffusing fine particles is large, strong light diffusibility can be expressed with a small number of the light diffusing fine particles. In alight diffusing element including a small number of the light diffusing fine particles, backscattering is suppressed. In the present invention, the precursor of a resin component present around the light diffusing fine particles permeates the light diffusing fine particles, and hence the precursor of a resin component does not permeate part of the light diffusing fine particles substantially brought into contact with the application liquid surface in the application liquid applied onto the base material. As a result, the light diffusing fine particles can be prevented from increasing to protrude from the applied film, and light diffusing fine particles having a large average particle diameter can be allowed to be present without impairing smoothness.

The obtained light diffusing element may be peeled from the base material to be used as a single member, may be used as a light diffusing element with a base material, may be transferred from the base material to a polarizing plate or the like to be used as a composite member (e.g., polarizing plate with a light diffusing element), or may be bonded together with the base material to a polarizing plate or the like to be used as a composite member (e.g., polarizing plate with a light diffusing element). When the light diffusing element is bonded together with the base material to a polarizing plate or the like to be used as a composite member (e.g., polarizing plate with a light diffusing element), the base material may function as a protective layer for the polarizing plate.

B. Light Diffusing Element

A light diffusing element of the present invention may be obtained by the method described in the section A-1 to the section A-3. The light diffusing element of the present invention includes a matrix including a resin component and ultrafine particle components, and light diffusing fine particles dispersed in the matrix. The light diffusing element of the present invention expresses a light diffusing function by virtue of a refractive index difference between the matrix and each of the light diffusing fine particles. FIG. 1 is a schematic view for illustrating a dispersed state of a resin component of a matrix and light diffusing fine particles in a light diffusing element to be obtained by a manufacturing method according to a preferred embodiment of the present invention. A light diffusing element 100 of the present invention includes a matrix 10 including a resin component 11 and ultrafine particle components 12, and light diffusing fine particles 20 dispersed in the matrix 10. The refractive indices of the resin component of the matrix and the light diffusing fine particles preferably satisfy the following expression (1).

$$0<|n_P-n_A| \qquad (1)$$

The refractive index of each of the ultrafine particle components preferably satisfies the following expressions (2) and (3).

$$0<|n_P-n_A|<|n_P-n_B| \qquad (2)$$

$$|n_P-n_A|<|n_A-n_B| \qquad (3)$$

When the resin component of the matrix and the light diffusing fine particles having the relationship of the expression (1) are used, and the ultrafine particle components having the relationships of the expressions (2) and (3) are used, a light diffusing element having suppressed backscattering while maintaining a high haze can be obtained.

Figure 2:
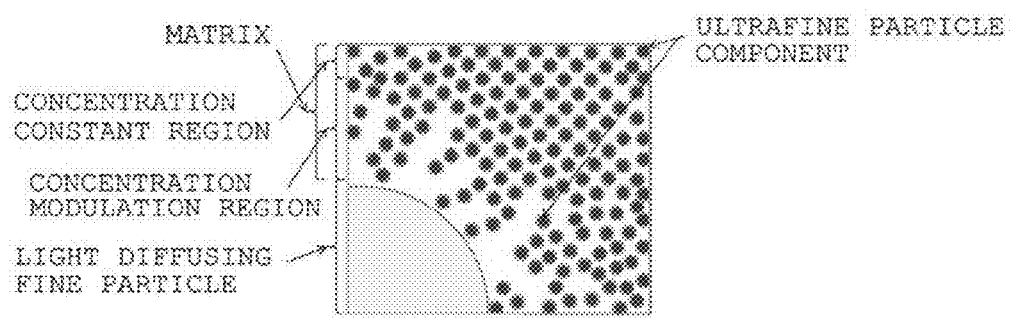
FIG. 2 is an enlarged schematic view for illustrating the vicinity of a light diffusing fine particle in a light diffusing element of the present invention.

It is preferred that, as illustrated in FIG. 1 and FIG. 2, a concentration modulation region 30 having a substantially spherical shell shape be formed in the vicinity of an interface between the matrix and each of the light diffusing fine particles, the weight concentration of the ultrafine particle components in the concentration modulation region increasing with increasing distance from the light diffusing fine particle. Therefore, the matrix has the concentration modulation region 30 in the vicinity of the interface with each of the light diffusing fine particles, and a concentration constant region on the outer side (side away from the light diffusing fine particle) of the concentration modulation region 30. It is preferred that any other portion of the matrix than the concentration modulation region 30 be substantially the concentration constant region. In the concentration modulation region 30, the refractive index substantially continuously changes. As used herein, the phrase "the vicinity of an interface between the matrix and each of the light diffusing fine particles" encompasses the surface of the light diffusing fine particle, an external portion of the light diffusing fine particle near the surface, and an internal portion of the light diffusing fine particle near the surface.

Figure 3:
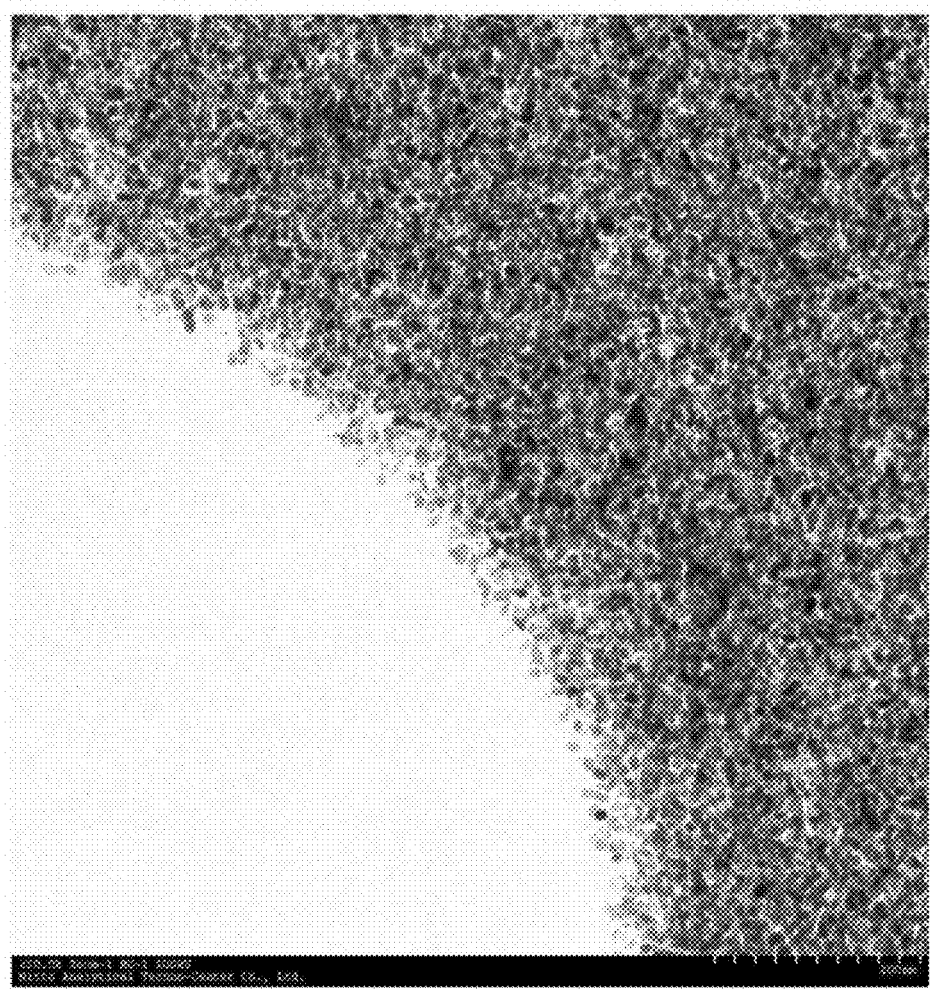
FIG. 3 is a transmission electron microscope image for showing the area ratio of ultrafine particle components in the matrix.

The concentration modulation region 30 is preferably formed by a substantial gradient of the dispersion concentration of the ultrafine particle components 12 in the matrix 10. Specifically, in the concentration modulation region 30, the dispersion concentration (typically specified in terms of weight concentration) of the ultrafine particle components 12 increases (inevitably, the weight concentration of the resin component 11 decreases) with increasing distance from the light diffusing fine particle 20. In other words, in a region of the concentration modulation region 30 closest to the light diffusing fine particle 20, the ultrafine particle components 12 are dispersed at a relatively low concentration, and the concentration of the ultrafine particle components 12 increases with increasing distance from the light diffusing fine particle 20. For example, the area ratio of the ultrafine particle components 12 in the matrix 10 based on a transmission electron microscope (TEM) image is small on a side close to the light diffusing fine particle 20 and large on a side close to the matrix 10, and the area ratio changes while forming a substantial gradient from the light diffusing fine particle side to the matrix side (concentration constant region side). A TEM image for showing a typical dispersed state of the ultrafine particle components is shown in FIG. 3. The term "area ratio of the ultrafine particle components in the matrix based on a transmission electron microscope image" as used herein refers to the ratio of the area occupied by the ultrafine particle components in the matrix in a predetermined range (predetermined area) in a transmission electron microscope image of a cross-section including the diameter of a light diffusing fine particle. The area ratio corresponds to the three-dimensional dispersion concentration (actual dispersion concentration) of the ultrafine particle components. The area ratio of the ultrafine particle components may be determined with any appropriate image analysis software. It should be noted that the area ratio typically corresponds to the average shortest distance between respective particles of the ultrafine particle components. Specifically, the average shortest distance between the respective particles of the ultrafine particle components decreases with increasing distance from the light diffusing fine particle in the concentration modulation region, and becomes constant in the concentration constant region (for example, the average shortest distance is from about 3 nm to 100 nm in a region closest to the light diffusing fine particle, and from 1 nm to 20 nm in the concentration constant region). The average shortest distance may be calculated by binarizing a TEM image of a dispersed state as shown in FIG. 3 and using, for example, the inter-centroid distance method of image analysis software "A-zo-kun" (manufactured by Asahi Kasei Engineering Corporation). As described above, according to the manufacturing method of the present invention, the concentration modulation region 30 can be formed in the vicinity of an interface between the matrix and each of the light diffusing fine particles through the utilization of the substantial gradient of the dispersion concentration of the ultrafine particle components 12, and hence the light diffusing element can be manufactured by a much simpler procedure at much lower cost as compared to the case where GRIN fine particles are manufactured by a complicated manufacturing method and the GRIN fine particles are dispersed. Further, when the concentration modulation region is formed through the utilization of the substantial gradient of the dispersion concentration of the ultrafine particle components, the refractive index can be allowed to smoothly change at a boundary between the concentration modulation region 30 and the concentration constant region. Further, through the use of the ultrafine particle components each having a refractive index significantly different from those of the resin component and the light diffusing fine particles, the refractive index difference between each of the light diffusing fine particles and the matrix (substantially the concentration constant region) can be increased, and the refractive index gradient of the concentration modulation region can be made steep.

The concentration modulation region may be formed by appropriately selecting materials for forming the resin component and the ultrafine particle components of the matrix, and the light diffusing fine particles, and chemical and thermodynamic characteristics thereof. For example, when the resin component and the light diffusing fine particles are formed of materials having high compatibility with each other among materials of the same type, the concentration modulation region can be satisfactorily formed. In addition, the concentration modulation region 30 is formed by, for example, as described in the section A-1 to the section A-3, performing the polymerization after the permeation of the precursor (monomer) of the resin component 11 into the inside of each of the light diffusing fine particles 20. The thickness and the concentration gradient of the concentration modulation region may be controlled by adjusting the chemical and thermodynamic characteristics of the resin component of the matrix and the light diffusing fine particles.

As described above, in the concentration modulation region 30, the refractive index substantially continuously changes. In addition, it is preferred that the refractive index in an outermost portion of the concentration modulation region and the refractive index of the concentration constant region are substantially the same. In other words, in the light diffusing element, the refractive index continuously changes from the concentration modulation region to the concentration constant region, and the refractive index preferably continuously changes from the light diffusing fine particle (more preferably, an internal portion of the light diffusing fine particle near the surface) to the concentration constant region (FIG. 4). The change in refractive index is preferably smooth as illustrated in FIG. 4. That is, the refractive index changes in such a shape that a tangent can be drawn on a refractive index change curve at a boundary between the concentration modulation region and the concentration constant region. In the concentration modulation region, the gradient of the change in refractive index preferably increases with increasing distance from the light diffusing fine particle. According to the light diffusing element of the present invention, a substantially continuous change in refractive index can be realized by appropriately selecting the light diffusing fine particles, and the resin component and the ultrafine particle components of the matrix. As a result, even when the refractive index difference between the matrix 10 (substantially the concentration constant region) and each of the light diffusing fine particles 20 is increased, reflection at an interface between the matrix 10 and each of the light diffusing fine particles 20 can be suppressed, and backscattering can be suppressed. Further, in the concentration constant region, the weight concentration of the ultrafine particle components 12 each having a refractive index significantly different from that of the light diffusing fine particles 20 is relatively high, and hence the refractive index difference between the matrix 10 (substantially the concentration constant region) and each of the light diffusing fine particles 20 can be increased. As a result, even in a thin film, a high haze (strong diffusibility) can be realized. the phrase "the refractive index substantially continuously changes" as used herein means that the refractive index only needs to substantially continuously change at least from the light diffusing fine particle to the concentration constant region in the concentration modulation region. Therefore, for example, even when a refractive index gap in a predetermined range (e.g., a refractive index difference of 0.05 or less) is present at an interface between the light diffusing fine particle and the concentration modulation region, and/or an interface between the concentration modulation region and the concentration constant region, the gap may be permitted.

The thickness of the concentration modulation region (distance from the innermost portion of the concentration modulation region to the outermost portion of the concentration modulation region) may be constant (that is, the concentration modulation region may spread at the circumference of the light diffusing fine particle in a concentric sphere shape), or the thickness may vary depending on the position of the surface of the light diffusing fine particle (for example, the concentration modulation region may have a shape similar to the contour of konpeito candy). The thickness of the concentration modulation region 30 preferably varies depending on the position of the surface of the light diffusing fine particle. With such construction, the refractive index can be allowed to change more smoothly and continuously in the concentration modulation region 30.

The concentration modulation region 30 has an average thickness of preferably from 5 nm to 500 nm, more preferably from 12 nm to 400 nm, still more preferably from 15 nm to 300 nm. When the average thickness is less than 5 nm, backscattering may increase. When the average thickness is more than 500 nm, the diffusibility may become insufficient. Even with such extremely small average thickness of the concentration modulation region 30, the light diffusing element of the present invention can realize a thin-film light diffusing element having a high haze value, having strong diffusibility, and having suppressed backscattering. The average thickness is an average thickness in the case where the thickness of the concentration modulation region 30 varies depending on the position of the surface of the light diffusing fine particle, and in the case where the thickness is constant, is the constant thickness.

The haze value of the light diffusing element is preferably as high as possible. Specifically, the haze value is preferably 70% or more, more preferably from 90% to 99.5%, still more preferably from 92% to 99.5%, particularly preferably from 95% to 99.5%, most preferably from 97% to 99.5%. When the haze value is 70% or more, the light diffusing element can be suitably used as a front light diffusing element in a collimated backlight front diffusing system. It should be noted that the collimated backlight front diffusing system refers to a system in which a front light diffusing element is arranged on a viewer side of an upper polarizing plate, using collimated backlight light (backlight light having a narrow brightness half-width condensed in a constant direction) in a liquid crystal display apparatus.

The diffusion characteristic of the light diffusing element in terms of light diffusion half-angle is preferably from 10° to 150° (one side: 5° to 75°), more preferably from 10° to 100° (one side: 5° to 50°), still more preferably from 30° to 80° (one side: 15° to 40°).

The thickness of the light diffusing element may be appropriately set depending on purposes and desired diffusing characteristics. Specifically, the thickness of the light diffusing element is preferably from 4 µm to 50 µm, more preferably from 4 µm to 20 µm. According to the present invention, a light diffusing element having the extremely high haze as described above despite such extremely thin thickness can be obtained.

According to the manufacturing method of the present invention, a light diffusing element having excellent smoothness is obtained. The light diffusing element having excellent smoothness as just described has less backscattering.

The light diffusing element has an arithmetic average surface roughness Ra of preferably less than 0.05 mm, more preferably 0.04 mm or less, still more preferably 0.03 mm or less. The arithmetic average surface roughness Ra of the light diffusing element is preferably as small as possible, but its practical lower limit value is, for example, 0.001 mm. It should be noted that the term "arithmetic average surface roughness Ra" as used herein refers to an arithmetic average surface roughness Ra specified in JIS B 0601 (1994 edition).

The light diffusing element has a ten-point average surface roughness Rz of preferably less than 0.20 µm, more preferably less than 0.17 µm, still more preferably less than 0.15 µm. The ten-point average roughness Rz of the light diffusing element is preferably as small as possible, but its practical lower limit value is, for example, 0.005 µm. It should be noted that the term "ten-point average surface roughness Rz" as used herein refers to a ten-point average surface roughness Rz specified in JIS B 0601 (1994 edition).

The light diffusing element has an average tilt angle θa of preferably less than 0.50°, more preferably less than 0.45°, still more preferably 0.40° or less. The average tilt angle θa of the light diffusing element is preferably as small as possible, but its practical lower limit value is, for example, 0.01°. It should be noted that the average tilt angle θa is herein defined by the following expression (4).

$$\theta a = \tan^{-1} \Delta a \quad (4)$$

In the expression (4), Δa is, as represented by the following mathematical expression (5), a value obtained by dividing the sum (h1+h2+h3 . . . +hn) of the differences (heights h) between adjacent peaks and the lowest point of the trough in a standard length L of the roughness curve specified in JIS B 0601 (1994 edition), by the standard length L. The roughness curve is a curve obtained by removing a surface waviness component longer than a predetermined wavelength from a profile curve through the use of a retardation compensation-type high-pass filter. In addition, the profile curve is a profile which appears at a cut surface when an object surface is cut in a plane perpendicular to the object surface.

$$\Delta a = (h1+h2+h3 \ldots +hn)/L \quad (5)$$

In one embodiment, the light diffusing element has a ten-point average surface roughness Rz of preferably less than 0.20 µm, more preferably less than 0.17 µm, still more preferably less than 0.15 µm, and has an average tilt angle θa of preferably less than 0.5°, more preferably less than 0.45°, still more preferably 0.40° or less.

The light diffusing element is suitably used for a viewer-side member for a liquid crystal display apparatus, a backlight member for a liquid crystal display apparatus, or a diffusing member for illumination equipment (e.g., organic EL, LED), and is particularly suitably used as a front diffusing element in a collimated backlight front diffusing system. The light diffusing element may be provided alone as a film-shaped or plate-shaped member, or may be provided as a composite member by being bonded to any appropriate base material or polarizing plate. In addition, an antireflection layer may be laminated on the light diffusing element.

Now, the present invention is specifically described byway of Examples. However, the present invention is not limited by these Examples. Evaluation methods in Examples are as described below. In addition, unless otherwise stated, "part(s)" and "%" in Examples are by weight.

(1) Thickness of Light Diffusing Element

The total thickness of a base material and a light diffusing element was measured with a microgauge-type thickness meter (manufactured by Mitutoyo Corporation), and the thickness of the base material was subtracted from the total thickness to calculate the thickness of the light diffusing element.

(2) Haze Value

Measurement was performed with a haze meter (manufactured by Murakami Color Research Laboratory Co., Ltd., trade name: "HN-150") in accordance with a method specified in JIS 7136.

(3) Backscattering Ratio

A laminate of a light diffusing element and a base material obtained in each of Examples and Comparative Examples was bonded onto a black acrylic plate (manufactured by Sumitomo Chemical Co., Ltd., trade name: "SUMIPEX" (trademark), thickness: 2 mm) through intermediation of a transparent pressure-sensitive adhesive to prepare a measurement sample. The integrated reflectance of the measurement sample was measured with a spectrophotometer (manufactured by Hitachi Ltd., trade name: "U4100"). On the other hand, a laminate of a base material and a transparent applied layer was produced as a control sample, using an application liquid in which fine particles were removed from the above-mentioned application liquid for a light diffusing element and the integrated reflectance (i.e., surface reflectance) thereof was measured in the same way as described above. The integrated reflectance (surface reflectance) of the control sample was subtracted from the integrated reflectance of the measurement sample to calculate a backscattering ratio of the light diffusing element.

(4) Ten-point Average Surface Roughness Rz, Arithmetic Average Surface Roughness Ra, and Average Tilt Angle θa A ten-point average surface roughness Rz, an arithmetic average surface roughness Ra, and an average tilt angle θa were measured using a microfigure measuring instrument (manufactured by Kosaka Laboratory Ltd., trade name: "Surfcorder ET-4000").

(5) Uneven Distribution of Ultrafine Particle Component

A laminate of a light diffusing element and a base material obtained in each of Examples and Comparative Examples was sliced so as to have a thickness of 0.1 μm with a microtome while being cooled with liquid nitrogen to prepare a measurement sample. A two-dimensional image of a cross-section of the measurement sample was observed using a transmission electron microscope (TEM) (manufactured by Hitachi, Ltd., trade name: "H-7650", accelerating voltage: 100 kV), and the occurrence of uneven distribution of ultrafine particle components in the light diffusing element of the measurement sample was checked. In a measurement field of view (13.9 μm×15.5 μm) at a direct magnification of ×1,200 and a magnification of ×10,000, the number of portions observed as white spots owing to the absence of the ultrafine particle components in the matrix (namely white spots other than white portions derived from light diffusing fine particles in the measurement field of view) was counted. For each laminate of a light diffusing element and a base material obtained in Examples and Comparative Examples, the numbers of white spots were counted as described above at 20 sites, and an average value thereof was calculated. The average value is shown in Table 1. As the number of white spots increases, the degree of uneven distribution of the ultrafine particle components is evaluated to be higher.

(6) Contrast in Bright Place (Production of Liquid Crystal Display Apparatus)

A liquid crystal cell was removed from a commercially available liquid crystal television (manufactured by Sony Corporation, BRAVIA (20-inch), trade name: "KDL20J3000") having a liquid crystal cell of a multi-domain-type VA mode. Commercially available polarizing plates (manufactured by Nitto Denko Corporation, trade name: "NPF-SEG1423DU") were bonded to both sides of the liquid crystal cell so that absorption axes of the respective polarizers were perpendicular to each other. More specifically, the polarizing plates were bonded to the liquid crystal cell so that the absorption axis direction of the polarizer of the backlight-side polarizing plate became a vertical direction (90° with respect to the longitudinal direction of the liquid crystal panel) and the absorption axis direction of the polarizer of the viewer-side polarizing plate became a horizontal direction (0° with respect to the longitudinal direction of the liquid crystal panel). Further, the light diffusing element of each of Examples and Comparative Examples was transferred from the base material to be bonded to the outer side of the viewer-side polarizing plate to produce a liquid crystal panel.

Meanwhile, a pattern of a lenticular lens was transferred to one surface of a PMMA sheet by melt thermal transfer through the use of a transfer roll. Aluminum was pattern deposited to a surface (smooth surface) on a side opposite to the surface on which the lens pattern was formed so that light passed through only a focal point of the lens, to thereby form a reflective layer having an area ratio of an opening of 7% (area ratio of a reflection portion of 93%). Thus, a light collecting element was produced. As a light source of a backlight, a cold cathode fluorescent lamp (manufactured by Sony Corporation, CCFL of BRAVIA20J) was used, and the light collecting element was mounted to the light source to produce a collimated light source apparatus (backlight unit) emitting collimated light.

The above-mentioned backlight unit was incorporated into the above-mentioned liquid crystal panel to produce a liquid crystal display apparatus of a collimated backlight front diffusing system.

(Measurement of Contrast)

A fluorescent lamp (200 lx: value measured with a luminometer IM-5) was placed so that output light entered a liquid crystal display apparatus while forming an angle of 15° with respect to the vertical direction of the liquid crystal display apparatus, and light was applied. The brightness of each of a black display and a white display was measured with a conoscope manufactured by AUTRONIC MELCHERS GmbH, and contrast was evaluated.

Example 1

15 Parts of polymethyl methacrylate (PMMA) fine particles (manufactured by Sekisui Plastics Co., Ltd., trade name: "XX131AA", average particle diameter: 2.5 μm, refractive index: 1.49) serving as light diffusing fine particles, and 30 parts of a mixed solvent of butyl acetate and MEK (weight ratio 50/50) serving as an organic solvent were mixed and stirred for 60 minutes to prepare a mixed liquid.

Next, to the resultant mixed liquid, 100 parts of a hard coat resin (manufactured by JSR Corporation, trade name: "OPSTAR KZ6661" (containing MEK/MIBK)) containing 62% of zirconia nanoparticles (average particle diameter: 60 nm, refractive index: 2.19) serving as ultrafine particle components, 22 parts of pentaerythritol triacrylate (manufactured by Osaka Organic Chemical Industry Ltd., trade name: "Viscoat #300", refractive index: 1.52, molecular weight: 298) serving as a precursor of a resin component, 0.5 part of a photopolymerization initiator (manufactured by Ciba Specialty Chemicals, trade name: "Irgacure 907"), and 0.5 part of a leveling agent (manufactured by DIC Corporation, trade name: "GRANDIC PC 4100") were added, and the mixture was stirred using a disper for 15 minutes to prepare an application liquid.

Immediately after its preparation, the application liquid was applied onto a TAC film (manufactured by Fujifilm Corporation, trade name: "FUJITAC") using a bar coater and heated at 60° C. for 1 minute, followed by irradiation with UV light having an integrated light quantity of 300 mJ. Thus, a light diffusing element having a thickness of 10 μm was obtained. The obtained light diffusing element was subjected to the evaluations (2) to (6). Further, a TEM photograph of a cross-section of the light diffusing element is shown in FIG. 5(a).

It should be noted that when white brightness in a dark place was set to 300 cd/m², black brightness became 0.3 cd/m² and thus contrast in the dark place was 1,000.

Example 2

A light diffusing element was obtained in the same manner as in Example 1 except that dipentaerythritol hexaacrylate (manufactured by Shin-Nakamura Chemical Co., Ltd., trade name: "NK Ester", refractive index: 1.52, molecular weight: 632) was used instead of pentaerythritol triacrylate (manufactured by Osaka Organic Chemical Industry Ltd., trade name: "Viscoat #300", refractive index: 1.52, molecular weight: 298) serving as a precursor of a resin component. The obtained light diffusing element was subjected to the evaluations (2) to (6). The results are shown in Table 1.

Example 3

A light diffusing element was obtained in the same manner as in Example 1 except that 30 parts of MEK was used instead of 30 parts of the mixed solvent of butyl acetate and MEK (weight ratio: 50/50) serving as an organic solvent. The obtained light diffusing element was subjected to the evaluations (2) to (6). The results are shown in Table 1.

Comparative Example 1

To 100 parts of a hard coat resin (manufactured by JSR Corporation, trade name: "OPSTAR KZ6661" (containing MEK/MIBK)) containing 62% of zirconia nanoparticles (average particle diameter: 60 nm, refractive index: 2.19) serving as ultrafine particle components, 11 parts of a 50% MEK solution of pentaerythritol triacrylate (manufactured by Osaka Organic Chemical Industry Ltd., trade name: "Viscoat #300", refractive index: 1.52) serving as a precursor of a resin component, 0.5 part of a photopolymerization initiator (manufactured by Ciba Specialty Chemicals, trade name: "Irgacure 907"), 0.5 part of a leveling agent (manufactured by DIC Corporation, trade name: "GRANDIC PC 4100"), and 15 parts of polymethyl methacrylate (PMMA) fine particles (manufactured by Sekisui Plastics Co., Ltd., trade name: "XX131AA", average particle diameter: 2.5 μm, refractive index: 1.49) serving as light diffusing fine particles were added. The mixture was subjected to ultrasound treatment for 5 minutes to prepare an application liquid having the above-mentioned components homogeneously dispersed therein. The application liquid was left to stand still for 24 hours, and was then applied onto a TAC film (manufactured by Fuji film Corporation, trade name: "FUJITAC") using a bar coater and heated at 60° C. for 1 minute, followed by irradiation with UV light having an integrated light quantity of 300 mJ. Thus, a light diffusing element having a thickness of 10 μm was obtained. The obtained light diffusing element was subjected to the evaluations (2) to (6). The results are shown in Table 1. Further, a TEM photograph of a cross-section of the light diffusing element is shown in FIG. 5(b).

Comparative Example 2

To 100 parts of a hard coat resin (manufactured by JSR Corporation, trade name: "Opster KZ6661" (containing MEK/MIBK)) containing 62% of zirconia nanoparticles (average particle diameter: 60 nm, refractive index: 2.19) serving as ultrafine particle components, 11 parts of a 50% butyl acetate solution of pentaerythritol triacrylate (manufactured by Osaka Organic Chemical Industry Ltd., trade name: "Biscoat #300", refractive index: 1.52) serving as a precursor of a resin component, 0.5 part of a photopolymerization initiator (manufactured by Ciba Specialty Chemicals, trade name: "Irgacure 907"), 0.5 part of a leveling agent (manufactured by DIC Corporation, trade name: "GRANDIC PC 4100"), and 15 parts of polymethyl methacrylate (PMMA) fine particles (manufactured by Sekisui Plastics Co., Ltd., trade name: "XX131AA", average particle diameter: 2.5 μm, refractive index: 1.49) serving as light diffusing fine particles were added. The mixture was subjected to ultrasound treatment for 5 minutes to prepare an application liquid having the above-mentioned components homogeneously dispersed therein. The application liquid was left to stand still for 72 hours, and was then applied onto a TAC film (manufactured by Fujifilm Corporation, trade name: "FUJITAC") using a bar coater and heated at 60° C. for 1 minute, followed by irradiation with UV light having an integrated light quantity of 300 mJ. Thus, a light diffusing element having a thickness of 10 μm was obtained. The obtained light diffusing element was subjected to the evaluations (2) to (6). The results are shown in Table 1.

Comparative Example 3

A light diffusing element was obtained in the same manner as in Comparative Example 1 except that the application liquid was applied immediately after its preparation without being left to stand still. The obtained light diffusing element was subjected to the evaluations (2) to (6). The results are shown in Table 1.

Comparative Example 4

A light diffusing element was obtained in the same manner as in Comparative Example 1 except that: the application liquid was applied immediately after its preparation without being left to stand still; and the heating temperature was changed to 100° C. The obtained light diffusing element was subjected to the evaluations (2) to (6). The results are shown in Table 1. Further, a TEM photograph of a cross-section of the light diffusing element is shown in FIG. 5(c).

TABLE 1

| | Solvent | Mixing method | Molecular weight of monomer | Period of time of standing still (hours) | Heating temperature (° C.) | Haze (%) | Backscattering (%) |
|---|---|---|---|---|---|---|---|
| Example 1 | Butyl acetate/MEK | Sequential | 298 | 0 | 60 | 99.1 | 0.29 |
| Example 2 | Butyl acetate/MEK | Sequential | 632 | 0 | 60 | 98.7 | 0.25 |
| Example 3 | MEK | Sequential | 298 | 0 | 60 | 98.9 | 0.32 |
| Comparative Example 1 | MEK | Simultaneous | 298 | 24 | 60 | 98.5 | 0.39 |
| Comparative Example 2 | Butyl acetate | Simultaneous | 298 | 72 | 60 | 99.0 | 0.38 |
| Comparative Example 3 | MEK | Simultaneous | 298 | 0 | 60 | 97.5 | 0.12 |
| Comparative Example 4 | MEK | Simultaneous | 298 | 0 | 100 | 98.2 | 0.49 |

| | Ra (mm) | Rz (μm) | θa (°) | Uneven distribution of ultrafine particle components (number of white spots) | Contrast in bright place |
|---|---|---|---|---|---|
| Example 1 | 0.014 | 0.09 | 0.31 | 2 | 320 |
| Example 2 | 0.022 | 0.10 | 0.35 | 3 | 308 |
| Example 3 | 0.030 | 0.14 | 0.33 | 7 | 276 |
| Comparative Example 1 | 0.041 | 0.21 | 0.45 | 28 | 196 |
| Comparative Example 2 | 0.021 | 0.11 | 0.35 | 10 | 312 |
| Comparative Example 3 | 0.040 | 0.21 | 0.57 | 4 | 176 |
| Comparative Example 4 | 0.10 | 0.51 | 0.97 | 34 | 143 |

As apparent from Examples, according to the method of manufacturing a light diffusing element of the present invention, even when the application liquid is applied immediately after its preparation, a light diffusing element having a high haze value and having strong diffusibility can be manufactured. In addition, the light diffusing element obtained by the manufacturing method of the present invention has excellent surface smoothness and having less backscattering. As apparent from the low degree of uneven distribution of the ultrafine particle components, according to the method of manufacturing a light diffusing element of the present invention, the light diffusing element having the excellent characteristics as described above is obtained probably because the aggregation of the light diffusing fine particles and the ultrafine particle components hardly occurs. Further, when a monomer having a low molecular weight is used as the precursor of a resin component, a light diffusing element having more excellent light diffusibility can be obtained (comparison between Examples 1 and 2). When a solvent having a high boiling point is used as the organic solvent of the mixed liquid, a light diffusing element having more excellent surface smoothness can be obtained (comparison between Examples 1 and 3). On the other hand, as shown in Comparative Examples, when the light diffusing fine particles, the precursor of a resin component, and the ultrafine particle components are simultaneously mixed, a sufficient haze value is not obtained unless the application liquid is left to stand still for a predetermined period of time or the heating temperature after the application is increased (Comparative Example 3). In addition, in each of the case where the application liquid is left to stand still for a predetermined period of time and the case where the heating temperature after the application is increased, only a light diffusing element having significant backscattering is obtained owing to the aggregation of the light diffusing fine particles and/or the ultrafine particle components (Comparative Examples 1, 2, and 4).

INDUSTRIAL APPLICABILITY

The light diffusing element obtained by the manufacturing method of the present invention is suitably used for a viewer-side member for a liquid crystal display apparatus, a backlight member for a liquid crystal display apparatus, or a diffusing member for illumination equipment (e.g., organic EL, LED), and is particularly suitably used as a front diffusing element in a collimated backlight front diffusing system.

REFERENCE SIGNS LIST

10 matrix
11 resin component
20 light diffusing fine particle
30 concentration modulation region
100 light diffusing element

The invention claimed is:
1. A method of manufacturing a light diffusing element, comprising:
   a step A of mixing light diffusing fine particles and an organic solvent to prepare a mixed liquid and to swell the light diffusing fine particles;
   a step B of mixing the mixed liquid and a matrix-forming material containing a precursor of a resin component and ultrafine particle components; and
   a step C of polymerizing the precursor of a resin component to form a matrix including a resin component and the ultrafine particle components;
   wherein immediately before the step B the light diffusing fine particles has a swelling degree of 105% to 200%.

2. The method of manufacturing a light diffusing element according to claim 1, wherein the precursor of a resin component has a molecular weight of from 100 to 700.

3. The method of manufacturing a light diffusing element according to claim 1, wherein the organic solvent has a boiling point of 70° C. or more.

4. The method of manufacturing a light diffusing element according to claim 1,
wherein the organic solvent comprises a mixed solvent of a first organic solvent and a second organic solvent, and
wherein the first organic solvent more easily permeates the light diffusing fine particles than the second organic solvent does, and has higher volatility than the second organic solvent.

5. The method of manufacturing a light diffusing element according to claim 1, further comprising a step of heating a dispersion liquid obtained by the mixing of the mixed liquid and the matrix-forming material containing the precursor of a resin component and the ultrafine particle components, wherein the heating is performed at a temperature of 80° C. or less.

6. The method of manufacturing a light diffusing element according to claim 1, wherein the step C comprises forming a concentration modulation region having a substantially spherical shell shape in a vicinity of an interface between the matrix and each of the light diffusing fine particles, a weight concentration of the ultrafine particle components in the concentration modulation region increasing with increasing distance from the each of the light diffusing fine particles.

7. A light diffusing element, which is obtained by the method of claim 1, the light diffusing element having a haze value of 70% or more.

8. The light diffusing element according to claim 7, wherein the light diffusing element has a ten-point average surface roughness Rz of less than 0.20 μm.

9. The light diffusing element according to claim 7, wherein the light diffusing element has an average tilt angle θa of less than 0.50°.

10. The light diffusing element according to claim 7, wherein the light diffusing element has an arithmetic average surface roughness Ra of less than 0.05 mm.

* * * * *